US 9,001,801 B2

(12) United States Patent
Hillyard et al.

(10) Patent No.: US 9,001,801 B2
(45) Date of Patent: Apr. 7, 2015

(54) METHOD AND SYSTEM FOR LOW POWER MODE MANAGEMENT FOR COMPLEX BLUETOOTH DEVICES

(75) Inventors: Jason Hillyard, San Diego, CA (US); Jaku Jose, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 3137 days.

(21) Appl. No.: 11/018,973

(22) Filed: Dec. 21, 2004

(65) Prior Publication Data
US 2006/0050670 A1    Mar. 9, 2006

Related U.S. Application Data

(60) Provisional application No. 60/607,652, filed on Sep. 7, 2004.

(51) Int. Cl.
  *H04W 84/12*  (2009.01)
  *H04W 52/02*  (2009.01)
  *H04W 52/28*  (2009.01)
  *H04W 84/18*  (2009.01)

(52) U.S. Cl.
  CPC ........ *H04W 52/0251* (2013.01); *H04W 52/288* (2013.01); *H04W 84/18* (2013.01); *Y02B 60/50* (2013.01)

(58) Field of Classification Search
  CPC ........... G06F 1/32; G06F 9/445; G06F 15/16; H04Q 7/24; H04B 7/00
  USPC ......... 370/338, 401, 386, 390, 350, 329, 406; 455/41.1, 41.2, 426.2, 449, 574
  See application file for complete search history.

(56) References Cited

U.S. PATENT DOCUMENTS

| | | | |
|---|---|---|---|
| 2005/0013386 A1* | 1/2005 | Ojard | 375/316 |
| 2005/0066006 A1* | 3/2005 | Fleck et al. | 709/206 |
| 2005/0066207 A1* | 3/2005 | Fleck et al. | 713/320 |
| 2005/0066209 A1* | 3/2005 | Kee et al. | 713/323 |
| 2005/0076256 A1* | 4/2005 | Fleck et al. | 713/320 |
| 2005/0083902 A1* | 4/2005 | Hashimoto | 370/349 |
| 2005/0107134 A1* | 5/2005 | Morioka et al. | 455/574 |
| 2006/0015197 A1* | 1/2006 | Gupta | 700/94 |
| 2007/0105548 A1* | 5/2007 | Mohan et al. | 455/426.1 |
| 2009/0149127 A1* | 6/2009 | Viitamaki et al. | 455/41.2 |

* cited by examiner

*Primary Examiner* — Khawar Iqbal
(74) *Attorney, Agent, or Firm* — McDermott Will & Emery LLP

(57) ABSTRACT

Methods and systems for controlling a personal area network access device are disclosed herein. Aspects of the method may comprise receiving an application event associated with a particular application running on a complex Bluetooth® device that is running a plurality of simultaneous applications, and determining whether a low power mode is allowed by the particular application running on the complex Bluetooth® device. If the low power mode is allowed by the particular application running on the complex Bluetooth® device, the complex Bluetooth® device running the particular application may be configured to operate utilizing the allowed low power mode. The allowed low power mode may be switched by the complex Bluetooth® device based on the application event. An active mode may be switched from a current mode prior to switching to the allowed power mode based on the application event.

48 Claims, 12 Drawing Sheets

| APP / EVENT | SNIFF MIN-MAX (ms) | PARK MIN-MAX (ms) |
|---|---|---|
| APP 1 | 300 - 800 | 100 - 200 |
| APP 2 | 100 - 200 | 100 - 200 |
| APP 3 Event 1 Event 2 ... Event N | 100 - 200 100 - 200 ... 200 - 300 | 100 - 200 |

METHOD AND SYSTEM FOR LOW POWER MODE MANAGEMENT FOR COMPLEX BLUETOOTH DEVICES

CROSS-REFERENCE TO RELATED APPLICATIONS/INCORPORATION BY REFERENCE

This application makes reference to, claims priority to, and claims the benefit of U.S. Provisional Application Ser. No. 60/607,652, filed Sep. 7, 2004 and entitled "Method And System For Low Power Mode Management For Complex Bluetooth® Devices."

FIELD OF THE INVENTION

Certain embodiments of the invention relate to wireless communication. More specifically, certain embodiments of the invention relate to a method and system for low power management for complex Bluetooth® devices.

BACKGROUND OF THE INVENTION

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day.

Bluetooth devices such as mobile phones and PDAs are evolving to become more complex. While the current generation of mobile phones may only support a single Bluetooth connection or application at a time, in the future phones will support multiple simultaneous connections and applications. Currently, there is no centralized intelligent management mechanism to arbitrate the low power mode requirements of the different applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for controlling a personal area network access device. Aspects of the method may comprise receiving an application event associated with a particular application running on a complex Bluetooth® device that is running a plurality of simultaneous applications, and determining whether a low power mode is allowed by the particular application running on the complex Bluetooth® device. If the low power mode is allowed by the particular application running on the complex Bluetooth® device, the complex Bluetooth® device running the particular application may be configured to operate utilizing the allowed low power mode. The allowed low power mode may be switched by the complex Bluetooth® device based on the application event. The complex Bluetooth® device may be switched from a current mode to an active mode prior to switching to the allowed power mode based on the application event.

The application event may be received by a low power manager, and may be communicated from the particular application to a low power manager. The low power mode may comprise at least one of a sniff mode indicator, a hold mode indicator, and a park mode indicator. The application event may comprise at least one of a "protocol connection open" event, a "protocol connection closed" event, an "application open" event, an "application closed" event, a "SCO open" event, a "SCO closed" event, a "connection idle" event, a "connection busy" event, and a "power mode changed to active" event. Settings for the allowed low power mode may be selected from a table, where the table may comprise at least one low power mode corresponding to the particular application. The table may comprise a plurality of simultaneous applications, at least one allowed low power mode corresponding to each of the plurality of simultaneous applications, and at least one event associated with each of the plurality of simultaneous applications.

If the allowed low power mode fails, the complex Bluetooth® device running the particular application may be configured to operate in an alternate low power mode. The alternate low power mode may be selected from a table based on the received application event. An active mode may be switched from the allowed low power mode prior to switching to the alternate low power mode. The allowed low power mode may be associated with a time interval which defines a period of time prior in which the allowed mode becomes active. The allowed mode may be active for a particular duration. If two or more of the plurality of simultaneous applications comprises the allowed low power mode, the low power mode which has smallest duration may be activated.

Another embodiment of the invention may provide a machine-readable storage, having stored thereon, a computer program having at least one code section executable by a machine, thereby causing the machine to perform the steps as described above for controlling a personal area network access device.

Aspects of the system for controlling a personal area network access device may comprise at least one processor that receives an application event associated with a particular application running on a complex Bluetooth® device that is running a plurality of simultaneous applications. The processor may determine whether a low power mode is allowed by the particular application running on the complex Bluetooth® device. If the low power mode is allowed by the particular application running on the complex Bluetooth® device, the complex Bluetooth® device running the particular application may be configured by the processor to operate utilizing the allowed low power mode. The complex Bluetooth® device may be switched to the allowed low power mode by the processor based on the application event.

The processor may switch the complex Bluetooth® device from a current mode to an active mode, prior to switching to the allowed power mode based on the application event. The application event may be received by a low power manager and may be communicated by the processor from the particular application to the low power manager. The low power mode may comprise a sniff mode indicator, a hold mode indicator, and/or a park mode indicator. The application event may comprise a "protocol connection open" event, a "protocol connection closed" event, an "application open" event, an "application closed" event, a "SCO open" event, a "SCO closed" event, a "connection idle" event, a "connection busy" event, and/or a "power mode changed to active" event. Settings for the allowed low power mode may be selected by the processor from a table, where the table may comprise at least one low power mode corresponding to the particular application.

The table may comprise simultaneous applications, one or more allowed low power modes corresponding to each of the simultaneous applications, and one or more events associated with each of the simultaneous applications. If the allowed low power mode fails, the complex Bluetooth® device running the particular application may be configured by the processor to operate in an alternate low power mode. The alternate low power mode may be selected by the processor from a table based on at least the received application event. The processor may switch the complex Bluetooth® device from the allowed low power mode to an active mode prior to switching to the alternate low power mode. The allowed low power mode may be associated with a time interval which may define a period of time, prior to which the allowed mode may become active. The allowed mode may be active for a particular duration. If two or more of the plurality of simultaneous applications comprises the allowed low power mode, the low power mode which has smallest duration may be activated by the processor.

These and other advantages, aspects and novel features of the present invention, as well as details of an illustrated embodiment thereof, will be more fully understood from the following description and drawings.

DETAILED DESCRIPTION OF THE INVENTION

The Bluetooth® community has recently developed specifications that define how to use streaming audio over a Bluetooth® link. This opens up the technology to a whole new class of audio devices, such as wireless stereo headsets, wireless speakers, and wireless portable MP3 players just to name a few. With the introduction of new Bluetooth® specifications for streaming audio, new Bluetooth® products such as wireless stereo headsets and wireless file streaming applications are becoming a reality. The Bluetooth® streaming audio system is defined by three Bluetooth® specifications plus a number of ISO/IEC audio standards and RFC Internet standards.

Figure 1:
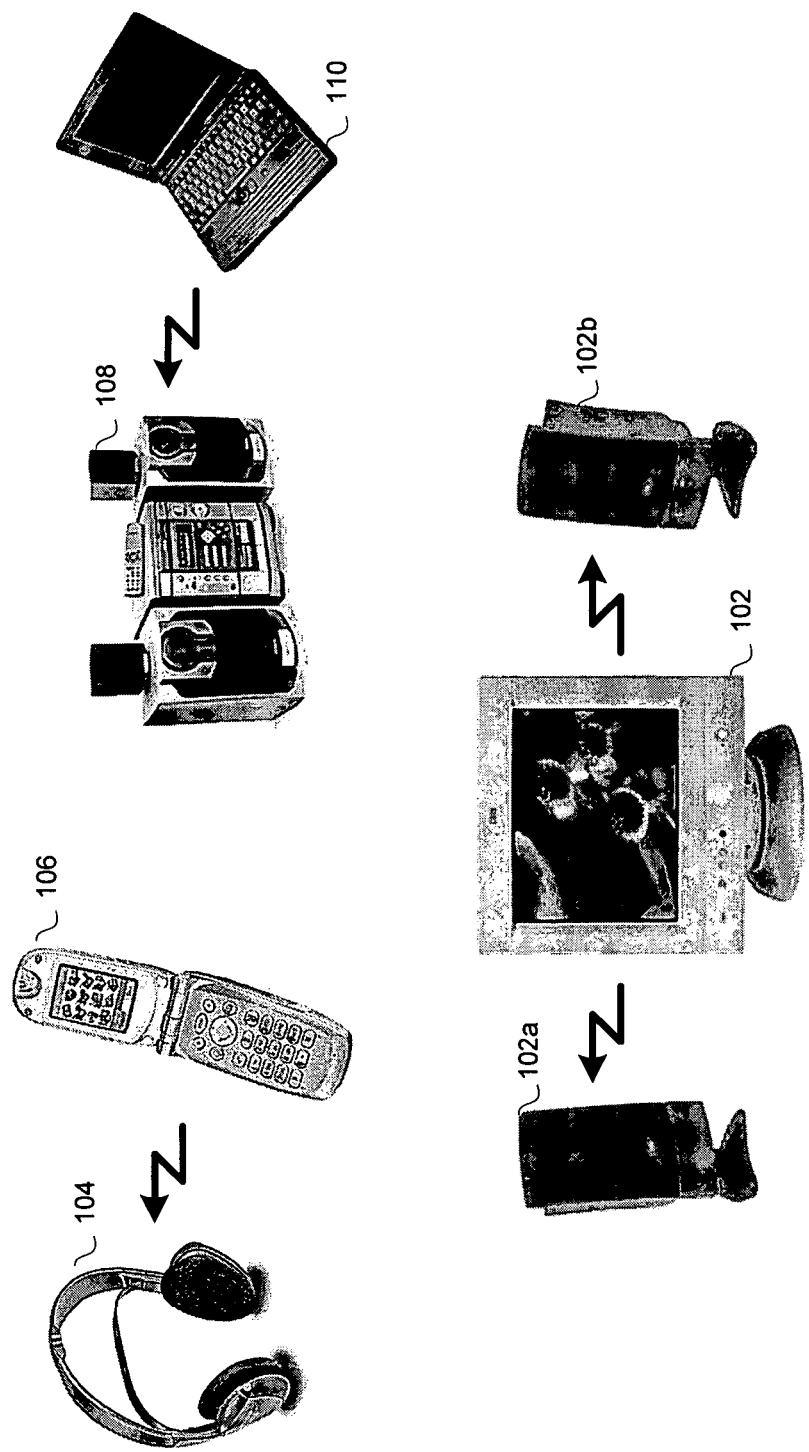
FIG. 1 is a diagram illustrating some examples of Bluetooth® (BT) streaming audio devices.

FIG. 1 is a diagram illustrating some examples of Bluetooth® (BT) streaming audio devices. Referring to FIG. 1, there is shown a stereo headset 104, a mobile phone 106, a Bluetooth®-enabled stereo system 108, personal computers (PC) 110 and 102, and stereo speakers 102a and 102b. The stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the PC 110, solving the problem of how to get the MP3's from the PC 110 to the stereo system 108. The PC 102 may play stereo audio to the pair of Bluetooth® wireless speakers 102a and 102b, thus freeing the desktop from wired clutter.

Bluetooth® is a frequency hopping spread spectrum (FHSS) radio system operating in the 2.4 GHz unlicensed band. Its low power transmissions allow a typical range of about 10 meters. Devices may connect to each other to form a network known as a piconet, with up to seven active devices in the piconet. The maximum data throughput between devices is approximately 723 kilobits per second (kbps), with the data capacity shared between devices on the piconet.

Bluetooth® has a protocol stack to transfer data and implement the advanced features required by applications. The protocol stack may comprise several different protocols designed for different purposes. Various profiles, or applications, may reside above the protocol stack. Bluetooth® may also comprise a lower protocol stack for link management and baseband control.

Figure 2:
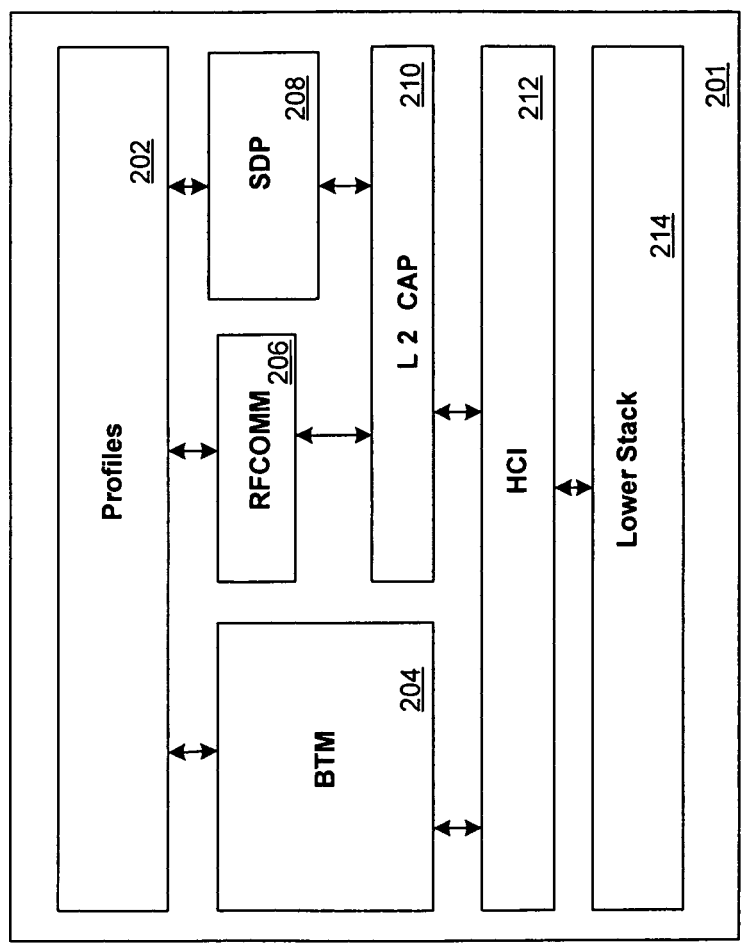
FIG. 2 is a simplified exemplary protocol stack.

FIG. 2 is a simplified exemplary protocol stack. Referring to FIG. 2, there is illustrated an exemplary Bluetooth® protocol stack 201. The exemplary Bluetooth® protocol stack 201 may comprise profiles protocol 202, Bluetooth® management entity (BTM) protocol 204, radio frequency communication (RFCOMM) protocol 206, service discovery protocol (SDP) 208, logical link control and adaptation protocol (L2CAP) 210, host controller interface (HCI) 212, and a lower stack 214. The profiles protocol 202 may comprise profiles of one or more applications that may be utilized in connection with the Bluetooth® protocol stack. The BTM protocol 204 makes it possible for various equipment to have wireless communication by integrating with a Bluetooth® module. The RFCOMM protocol 206 may be utilized to provide emulation of RS-232 serial ports over the L2CAP protocol. The RFCOMM protocol 206 may be utilized to emulate RS-232 control and data signals over the baseband, providing both transport capabilities for upper level services, such as OBEX, that use serial line as the transport mechanism.

The SDP 208 may be utilized for querying Bluetooth® device information, Bluetooth® device services, and characteristics of the services. The L2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. The HCI 212 may be adapted to provide a command interface to the baseband controller, link manager, and access to hardware status and control registers.

Figure 3:
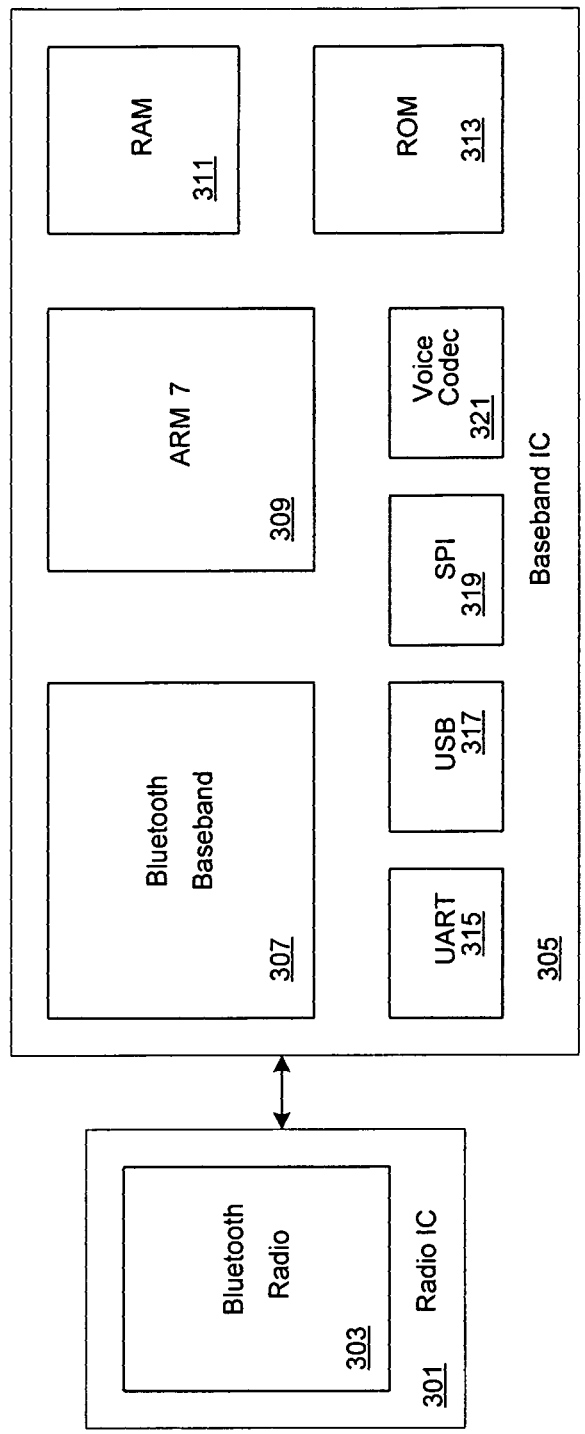
FIG. 3 is a block diagram illustrating an exemplary Bluetooth® hardware implementation.

Bluetooth® hardware implementations are typically highly integrated systems consisting of one or two chips. FIG. 3 is a block diagram illustrating an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, ARM7 processor 309, random access memory (RAM) 311, read only memory (ROM) 313, voice codec 321, a serial peripheral interface (SPI) 319, universal serial bus (USB) 317, and universal asynchronous receiver/transmitter (UART) 315. The radio IC 301 may be implemented in a separate chip. The ARM7 processor 309 may be adapted to operate all the required software including lower stack, upper stack, and embedded profile, for example. This type of single CPU implementation allows for a small, low power, and low cost solution.

The 723 kbps throughput of a Bluetooth® link may be suitable for streaming audio utilizing MP3 and/or other codec formats. Bluetooth® streaming audio may be defined by three Bluetooth® specifications covering the protocol and profiles: AVDTP, GAVDP, and A2DP. The Audio/Video Distribution Transport Protocol (AVDTP) is the protocol designed especially for Bluetooth® streaming audio and video. It may perform the signaling to configure, open, and/or close a stream between two devices. AN stream data may be transferred utilizing real-time protocol (RTP) packets. AVDTP sits in the protocol stack above L2CAP and may utilize separate L2CAP channels for signaling and data. The Generic Audio/Video Distribution Profile (GAVDP) is an abstract profile that defines how applications can use AVDTP. The Advanced Audio Distribution Profile (A2DP) defines how Bluetooth® streaming audio applications work. It defines how to get and set audio codec parameters for MPEG and/or other codecs. The A2DP may also define the media payload formats for packaging audio stream data into packets and may contain the specification for a new audio codec called SBC.

Figure 4:
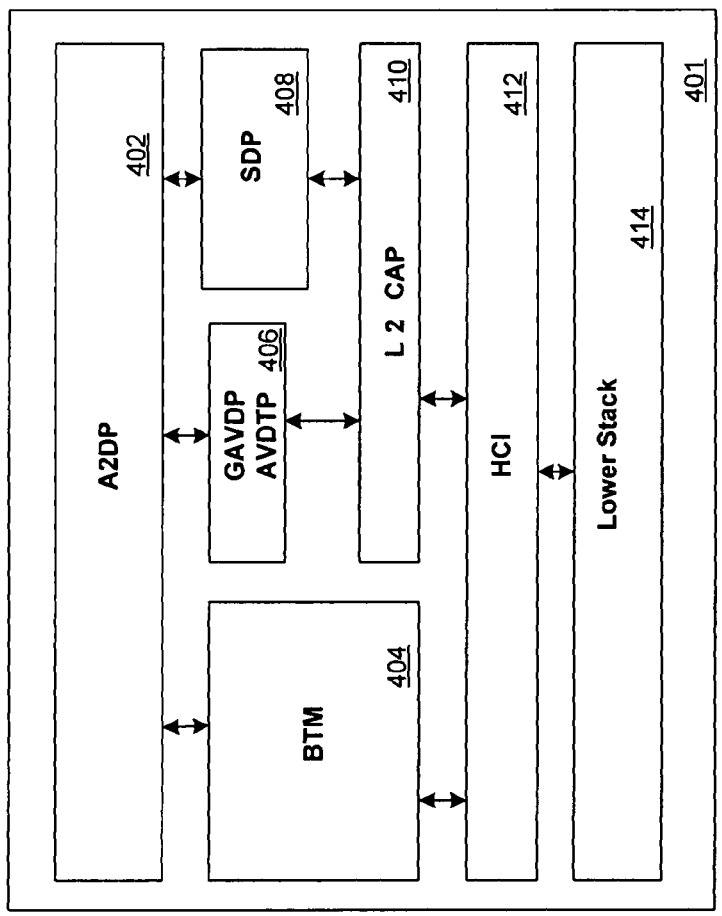
FIG. 4 is a block diagram illustrating a Bluetooth® protocol stack for streaming audio.

FIG. 4 is a block diagram illustrating a Bluetooth® protocol stack for streaming audio. Referring to FIG. 4, the Bluetooth® protocol stack for streaming audio 401 may comprise A2DP 402, Bluetooth® management entity (BTM) protocol 404, GAVDP/AVDTP 406, service discovery protocol (SDP) 408, logical link control and adaptation protocol (L2CAP) 410, host controller interface (HCI) 412, and a lower stack 414. In addition to the Bluetooth® specifications illustrated on FIG. 4, there are several ISO/IEC and Internet RFC specifications used for Bluetooth® streaming audio, which are summarized in Table 1.

TABLE 1

Additional specifications used for Bluetooth ® streaming audio

| Specification | Description |
| --- | --- |
| ISO/IEC 11172 part 3 | MPEG audio |
| ISO/IEC 13818 part 3 | MPEG audio |
| ISO/IEC 13818 part 7 | MPEG advanced audio |
| ISO/IEC 14496 part 3 | MPEG advanced audio |
| RFC 1889 | Real-time protocol (RTP) |
| RFC 2733 | RTP error correction |

TABLE 1-continued

Additional specifications used for Bluetooth ® streaming audio

| Specification | Description |
| --- | --- |
| RFC 3095 | Packet header compression |
| RFC 2250 | RTP payload format |
| RFC 3016 | RTP payload format |
| RFC 3119 | RTP payload format |

Figure 5:
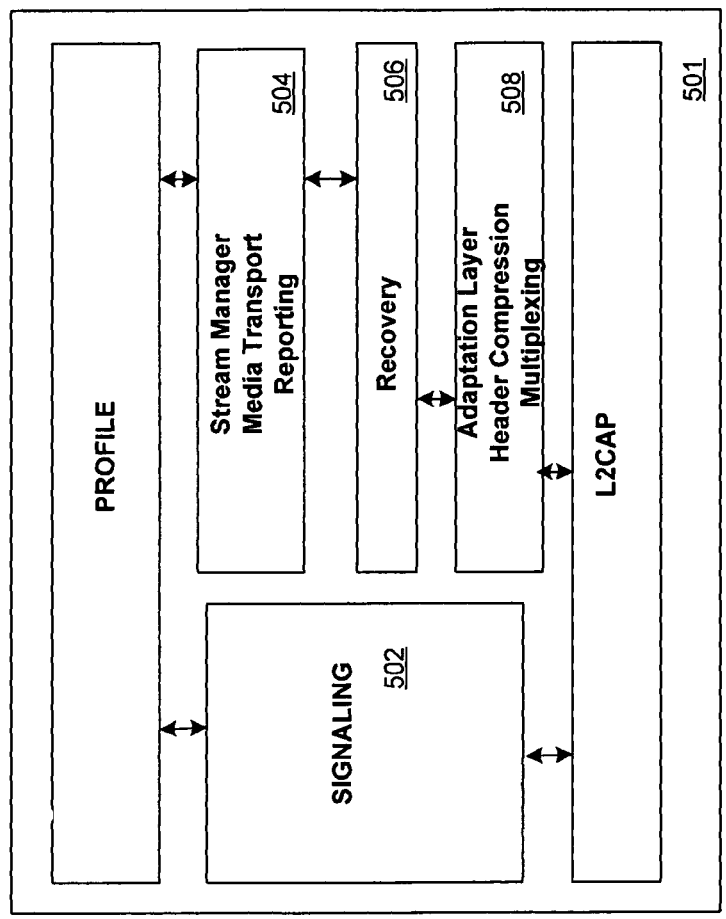
FIG. 5 is a block diagram illustrating AVDTP protocol features.

The bulk of the Bluetooth® streaming A/V system may be implemented in the AVDTP protocol. FIG. 5 is a block diagram illustrating AVDTP protocol features. Referring to FIG. 5, the AVDTP protocol may comprise a portion of the Bluetooth® protocol stack 501 and may be divided into four subsystems: signaling 502, stream management 504, recovery 506, and adaptation layer 508. AVDTP signaling messages 502 are used to discover, configure, open, and close a stream between two devices. There are eleven message types with some messages being optional.

A media transport feature of the stream manager 504 may be utilized to transfer RTP packets containing audio data. This feature is a required feature of AVDTP. The reporting feature of the stream manager 504 may allow link quality information, such as jitter and packet loss, to be exchanged utilizing the protocols defined in RFC 1889. This is an optional feature. The recovery feature 506 adds extra packets containing error correction data to the packet transfer. This feature may allow for lost packets to be recovered. The recovery mechanism is defined by RFC 2733. This is an optional feature and may require additional ROM and/or RAM.

A header compression feature of the adaptation layer 508 allows the RTP header to be compressed, as defined by RFC 3095. When used with AVDTP, the RTP header may be reduced by 5 to 7 bytes. This savings may probably not be worth the effort of implementing the feature especially when large media packets are used. A multiplexing feature of the AVDTP adaptation layer 508 allows L2CAP channels to be shared by media, reporting, and/or recovery packets, therefore resulting in fewer L2CAP channels and better baseband channel capacity utilization. This complex feature may be useful for devices which use multiple simultaneous streams with reporting and recovery.

A device implementing Bluetooth® streaming audio may need to consider several issues, which are not fully covered by the Bluetooth® specifications. Such issues may be related to implementation of optional features, multiple streams support, and/or data flow and synchronization issues, for example. One or more of these issues may be beyond the scope of the Bluetooth® specification.

Figure 6:
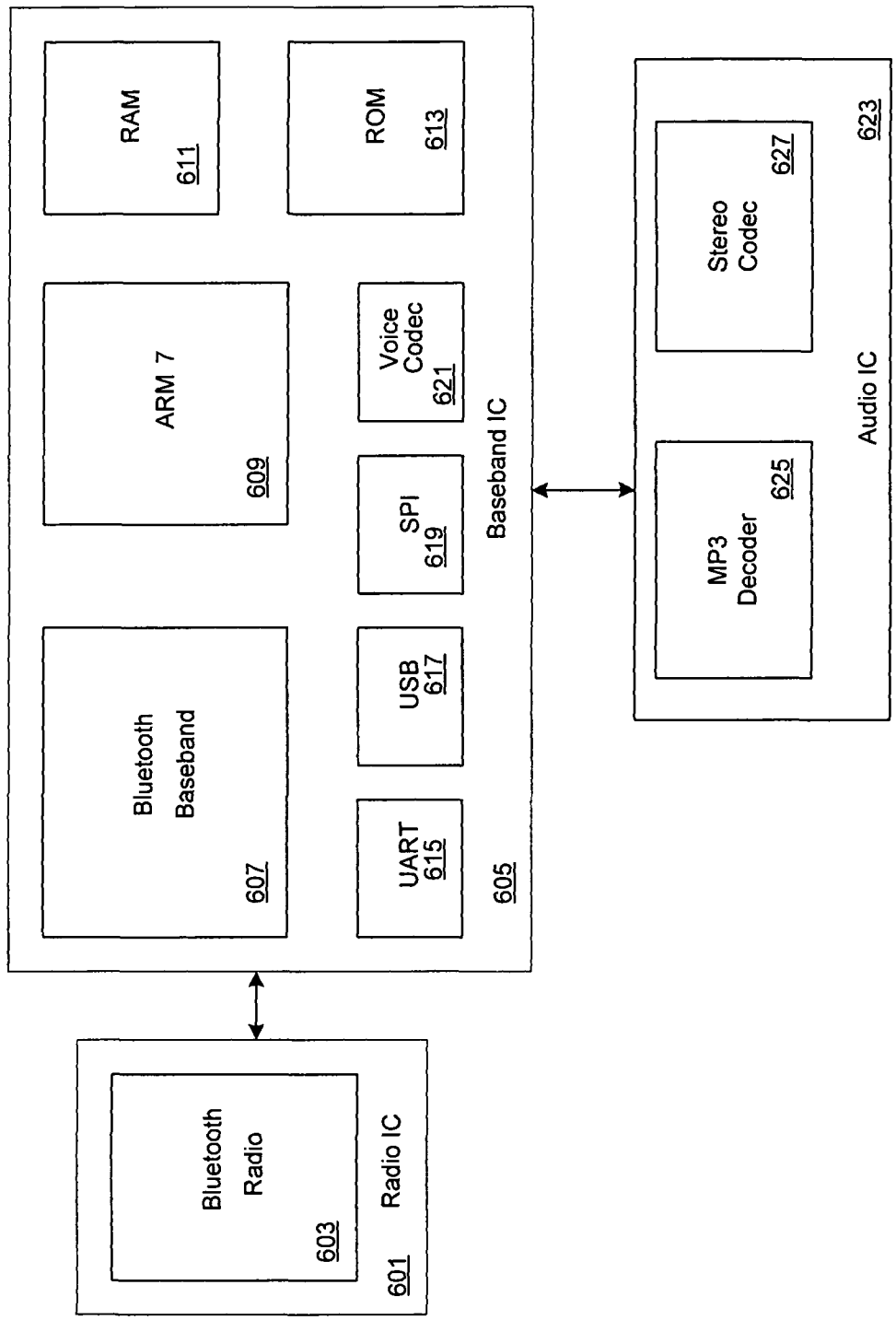
FIG. 6 is illustrated an exemplary hardware implementation for streaming audio playback.

FIG. 6 illustrates an exemplary hardware implementation for streaming audio playback. Referring to FIG. 6, the Bluetooth® hardware implementation for streaming audio playback may comprise a Bluetooth® baseband integrated circuit (IC) 605, a radio IC 601, and an audio IC 623. The radio IC 601 may comprise a Bluetooth® radio circuit 603. The audio IC 623 may comprise an MP3 decoder 625 and a stereo codec circuit 627. The baseband IC 605 may comprise Bluetooth® baseband circuit 607, ARM7 processor 609, random access memory (RAM) 611, read only memory (ROM) 613, voice codec 621, a serial peripheral interface (SPI) 619, universal serial bus (USB) 617, and universal asynchronous receiver/transmitter (UART) 615. The radio IC 601 and the audio IC 623 may be implemented in separate chips. The ARM7 processor 609 may be adapted to operate all the required software including lower stack, upper stack, and embedded profile, for example. Data received over the Bluetooth® link may be processed by the protocol stack and passed to an application. The application may acquire the audio stream data and may communicate it over a hardware interface to the audio IC 623. The audio IC 623 may decode the digital audio and may convert the audio signal to analog signal.

Implementing AVDTP with the minimum required features may require multiple streams support. For the simple streaming audio device examples shown in FIG. 1, optional features such as recovery, reporting, header compression, and multiplexing may not be required as Bluetooth® devices may be adapted to perform adequately without such features.

Maintaining a data transfer with a constant bit rate on a Bluetooth® link may be difficult to achieve. If data is sent too slowly, the audio decoder may run out of stream data to process, causing an audible error. Lost data packets may also cause the same problem. On the other hand, if data is sent too quickly, then data may be buffered up at the audio decoder, eventually causing congestion or data loss when the device runs out of buffer space. Since there is no flow control mechanism built into AVDTP or L2CAP, other mechanisms may be utilized to prevent data loss. The mechanism used by the audio source, or device sending the stream, may depend on the type of source. If the source is "live" and audio stream data is provided by an audio encoder, then the encoder itself may provide the constant bit rate. If the source is from a file, then a timer may be utilized to maintain a constant bit rate.

To understand the idea behind using a timer, consider this example. A device is sending an MP3 stream from a file encoded at 128 kbps and 48 kHz sample frequency Referring to Table 2a, this means an MP3 audio frame 384 bytes long is sent every 24.0 ms. If the device simply sets a periodic timer for 24.0 ms and sends a packet when the timer expires, the constant bit rate will be maintained.

TABLE 2a

Audio frame sizes for SBC and MP3.
Audio Frame Size vs. Data Rate and Sample Frequency

|  | SBC* | | | MP3 | | |
| --- | --- | --- | --- | --- | --- | --- |
|  | 64 kbps | 128 kbps | 320 kbps | 64 kbps | 128 kbps | 320 kbps |
| 48 kHz | 20 | 42 | 108 | 192 | 384 | 960 |
| 44.1 kHz | 22 | 46 | 118 | 209 | 418 | 1045 |
| 32 kHz | 32 | 64 | 162 | 228 | 576 | 1440 |

TABLE 2b

Audio frame periods for SBC and MP3.
Audio Frame Period vs. Sample Frequency

|  | SBC* | MP3 |
| --- | --- | --- |
| 48 kHz | 2.667 ms | 24.0 ms |
| 44.1 kHz | 2.902 ms | 26.122 ms |
| 32 kHz | 4.0 ms | 36.0 ms |

SBC frames may be small with a short period, as illustrated in Table 2b with regard to several typical values for SBC and MP3 audio frame periods. Some devices may have problems using timers or processing data at such short intervals. This suggests that rather than send a small packet containing a single frame at very short intervals, a larger packet containing several frames at longer intervals may be communicated instead. The maximum size of MP3 frames may correspond to the L2CAP MTU of the AVDTP transport channel, such that audio frames may not need to be fragmented across AVDTP packets.

Consider an example, in which a packet is sent every 24 ms. Consider what happens if the timer isn't so accurate and the packet actually gets sent at 20 ms or 29 ms. If a packet arrives late, the audio decoder may run out of data. Therefore, even a slight inaccuracy may cause malfunction if every packet is expected to be sent on time. A better approach would be to provide some slack in the data flow. Assuming the device receiving the stream is adapted to buffer up at least a few packets, a number of packets may be communicated as fast as possible when streaming starts. This helps with timer inaccuracy and data delayed by lost packets as well. The amount of packets that may be buffered may depend on the specific implementation of the device receiving the stream. The device receiving the stream may also improve the data flow. Regardless of how fast or slow the peer is sending the stream, the device receiving the stream can smooth out the flow by delaying playback until a number of packets have been received. This helps with timer inaccuracy and data delayed by lost packets.

When more than one stream is transferred between devices, the stream playback may be synchronized. Consider the example of the wireless PC speakers shown in FIG. 1. The PC may communicate a Bluetooth® audio stream to each speaker. There are actually two synchronization problems in this example. First, the audio playback of the two speakers may need to be synchronized with each other. Second, the audio playback may need to be synchronized with the display on the PC. Although the Bluetooth® specifications do not cover synchronization issues, there are some features of the system that may be utilized to address these synchronization problems.

Every Bluetooth® device has a free-running system clock, which determines the timing of the frequency-hopping transceiver. In a piconet, the slave devices are synchronized to the master's system clock. The speakers may both be synchronized to the Bluetooth® clock timing of the PC. Depending on the implementation of the Bluetooth® chip, it may be possible for an application to derive a timer based on the PC clock. The PC clock may be utilized in conjunction with the RTP presentation timestamp in the packet to synchronize the playback. Therefore, it may be possible to utilize the piconet timing as a synchronization source between the two speakers.

The second part of the synchronization problem boils down to how much delay is present from when the PC sends the audio stream to when the speakers play it back. Studies show that a delay larger than 80 ms may be noticeable in situations like this. As discussed earlier, however, it may be desirable for the device receiving a stream to buffer up a few audio frames before playback to help maintain a constant data rate on the link. This 80 ms limit may be an upper bound of how many frames to buffer. For example, an MP3 stream sampled at 44.1 kHz has a frame period of 26.122 ms. Therefore, no more than three frames may be buffered to keep delay under the timing corresponding to the limit.

Certain embodiments of the invention may be found in a method and system for low power mode management for complex Bluetooth® devices. Aspects of the method may comprise receiving an application event associated with a particular application running on a complex Bluetooth® device that is running a plurality of simultaneous applications, and determining whether a low power mode is allowed by the particular application running on the complex Bluetooth® device. If the low power mode is allowed by the particular application running on the complex Bluetooth® device, the complex Bluetooth® device running the particular application may be configured to operate utilizing the allowed low power mode. The allowed low power mode may be switched by the complex Bluetooth® device based on the application event. A complex Bluetooth® device may be switched from a current mode to an active mode prior to switching to the allowed power mode based on the application event.

Bluetooth® wireless technology defines three different low power modes that may be utilized to facilitate power savings on a link between two devices. The Bluetooth® specifications define how these low power modes operate and require that certain modes be supported for certain applications. As Bluetooth® devices get more complicated and support many simultaneous applications, managing the low power mode requirements becomes more complex and challenging. Accordingly, the invention provides a low power mode management mechanism for complex Bluetooth® devices, such as a mobile phone or PDA that runs multiple simultaneous applications each of which may possess different low power mode requirements.

The three low power modes specified by Bluetooth® are sniff mode, hold mode, and park mode. For sniff mode, during normal piconet operation, a device must turn on its receiver for its assigned time slot. While in sniff mode, the device may negotiate a regularly spaced interval such that it only needs to turn on its receiver on this interval. A typical sniff interval is 200-1000 milliseconds (ms). The device run may have a synchronous connection-oriented (SCO) connection, or audio connection, open and exchange data over an asynchronous connectionless (ACL) link. The device may stay in sniff mode until it is switched back to active mode. Hold mode is similar to sniff mode but on a one-time basis. During hold mode, the device will not receive packets for the hold interval. However, when the interval ends, the device may switch back to active mode. In addition, the device may have a SCO connection open. In park mode, the device is no longer a member of the piconet. It may periodically listen for beacon packets to maintain synchronization to the piconet. SCO connections cannot be open and data cannot be exchanged on the ACL link. A device will stay in park mode until it is switched back to an active operating mode.

Only one low power mode may be possible on an ACL link between devices. In addition, when switching between modes the device must first enter active mode. For example to switch from park to sniff the device must switch from park to active to sniff. In accordance with an embodiment of the invention, for low power management, each application sends events to the low power manager. These events may comprise: protocol connection open; protocol connection closed; application open; application closed; SCO open, SCO closed; connection idle; connection busy; and power mode changed to active. Each application may have a table which may be indexed by these events. The entry in the table may indicate a low power mode preference that may be utilized based on at least one corresponding event. There may be more than one low power mode per entry, indicating at least a first, preference. For example the first choice may be sniff. If sniff mode fails, the second choice is park. A timer value may also be associated with each mode, such that the low power mode switch will take place after the timer expires.

Figure 7:
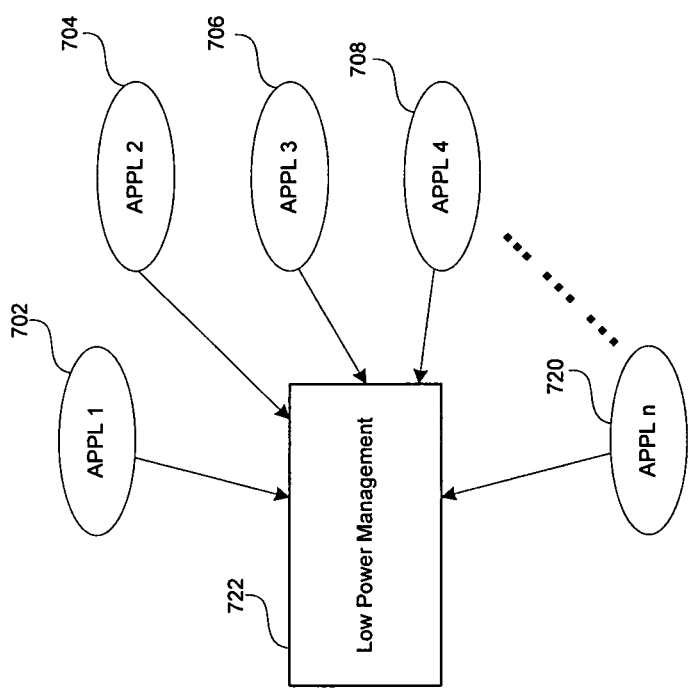
FIG. 7 is a block diagram illustrating the sending of events from applications to a low power manager, in accordance with an embodiment of the invention.

FIG. 7 is a block diagram illustrating the sending of events from applications to a low power manager, in accordance with an embodiment of the invention. Referring to FIG. 7, there is shown applications 702, 704, 706, 708, . . . , 720 and a low power management block 722. The low power management block 722 may be adapted to receive events from each of the applications 702, 704, 706, 708, . . . , 720.

In accordance with an embodiment of the invention, each table may possess an entry, which indicates the various modes that may be allowed by a particular application. For example, if application (App) 1 allows sniff and park but App 2 only allows sniff, App 2 may prevent App 1 from trying to use park. Additionally, the link policy settings may be changed based on the above entry such that the peer device may only initiate a low power mode allowed by all applications.

The following is an exemplary table of events and corresponding preferences and timer values that may be utilized for low power mode management for complex Bluetooth® devices, in accordance with an embodiment of the invention:
 (BTA_DM_PM_SNIFF|BTA_DM_PM_PARK),
  /* allow park & sniff */
   BTA_DM_PM_SNIFF, 5000, BTA_DM_PM_PARK, 5000,
   /* connection open: attempt sniff first after 5 seconds; if sniff fails attempt park after 5 seconds */
   BTA_DM_PM_NO_PREF, 0, BTA_DM_PM_NO_ACTION, 0,
   /* connection close: no preference */
   BTA_DM_PM_NO_ACTION, 0, BTA_DM_PM_NO_ACTION, 0,
   /* application open: no action */
   BTA_DM_PM_NO_ACTION, 0, BTA_DM_PM_NO_ACTION, 0,
   /* application close: no action */
   BTA_DM_PM_NO_ACTION, 0, BTA_DM_PM_NO_ACTION, 0,
   /* sco open: no action */
   BTA_DM_PM_SNIFF, 5000, BTA_DM_PM_PARK, 5000,
   /* sco close: attempt sniff first after 5 seconds; if sniff fails attempt park after 5 seconds */
   BTA_DM_PM_NO_ACTION, 0, BTA_DM_PM_NO_ACTION, 0,
   /* idle: no action */
   BTA_DM_PM_NO_ACTION, 0, BTA_DM_PM_NO_ACTION, 0,
   /* busy: no action */
   BTA_DM_PM_RETRY, 5000, BTA_DM_PM_NO_ACTION, 0
   /* mode change: retry last low power mode */,
where BTA_DM_PM_SNIFF corresponds to Bluetooth® application, device manager, power mode SNIFF; BTA_DM_PM_PARK corresponds to Bluetooth® application, device manager, power mode PARK; BTA_DM_PM_NO_PREF corresponds to Bluetooth® application, device manager, power mode "any"; BTA_DM_PM_NO_ACTION corresponds to Bluetooth® application, device manager, no power mode change; and BTA_DM_PM_RETRY corresponds to Bluetooth® application, device manager, retry power mode switch.

Figure 8:
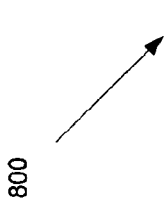
FIG. 8 illustrates a lookup table with sniff and park configurations that may be utilized, in connection with an embodiment of the invention.

In accordance with an aspect of the invention, there may be at least one other table, which may be adapted to contain sniff and park configurations. FIG. 8 illustrates a lookup table with sniff and park configurations that may be utilized, in connection with an embodiment of the invention. Referring to FIG. 8, lookup table 800 may comprise required configuration information, such as a minimum and a maximum interval for the sniff and park low power modes. In addition, lookup table 800 may also group the sniff and park minimum and maximum duration values in accordance with one or more applications and/or events. Lookup table 800 may be utilized since different applications may use the same mode but with different configurations. For example, App 1 may set sniff mode with a maximum interval of 800 ms and App 2 may set sniff mode with a maximum interval of 200 ms.

Further, each application may comprise a plurality of events and each event may be characterized with separate sniff and park duration values. For example, App 3 may comprise events 1 through N, where each event may be characterized by different duration values for the sniff and park modes. In an exemplary aspect of the invention, lookup table 800 may also comprise priority information indicating which configuration is more desirable if two or more applications are running simultaneously. For example the sniff configuration for App 2 may have a higher priority, so the sniff mode may be reset to a 200 ms interval.

Figure 9:
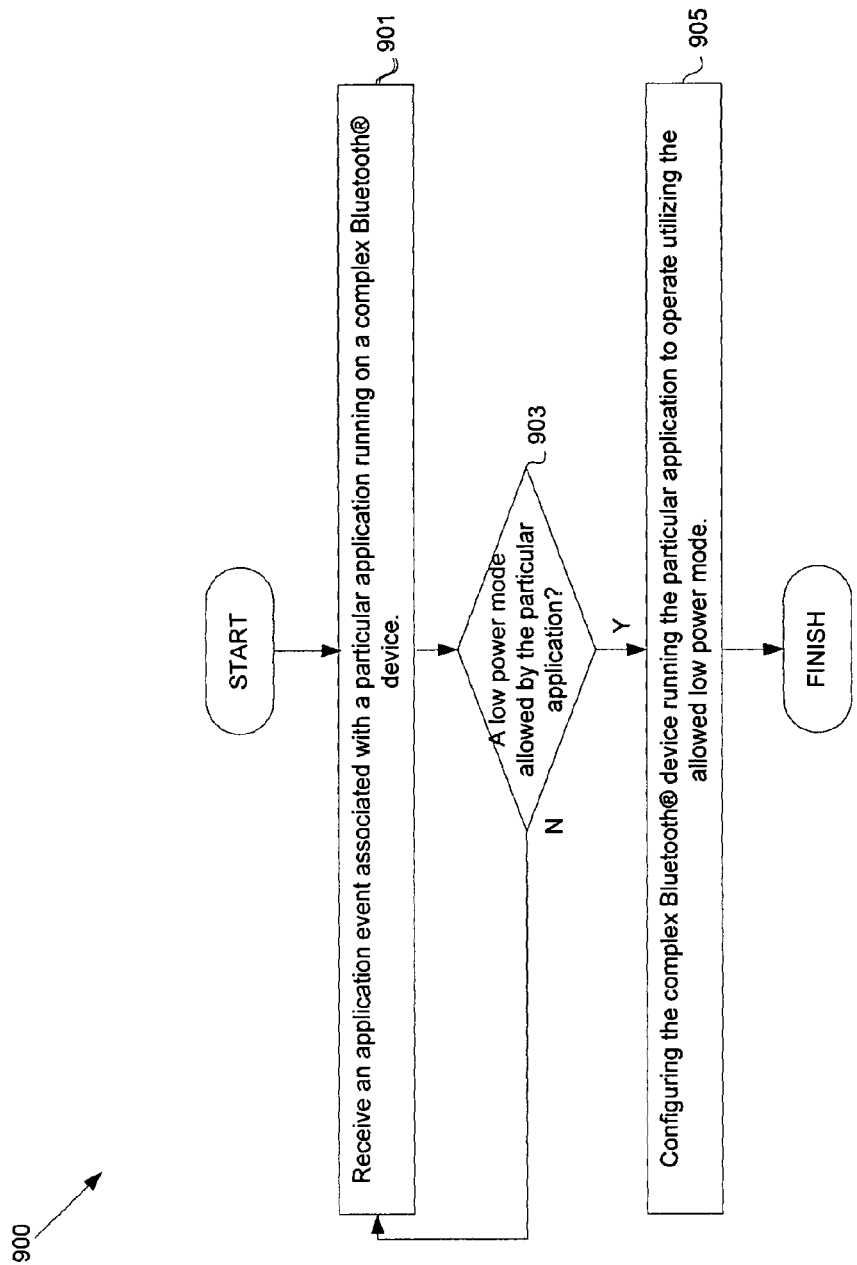
FIG. 9 is a flow diagram of an exemplary method for controlling a personal area network access device, in accordance with an embodiment of the invention.

FIG. 9 is a flow diagram 900 of an exemplary method for controlling a personal area network access device, in accordance with an embodiment of the invention. Referring to FIG. 9, at 901, an application event associated with a particular application running on a complex Bluetooth® device may be received. The application event may comprise, for example, one of the following events: protocol connection open; protocol connection closed; application open; application closed; SCO open; SCO closed; connection idle; connection busy; power mode changed to active; and timer expired. At 903, it may be determined whether a low power mode is allowed by the particular application. For example, it may be determined whether a sniff, park, and/or hold power mode is allowed by the particular application. If a low power mode is allowed by the particular application, at 905, the complex Bluetooth® device running the particular application may be configured to operate utilizing the allowed low power mode.

In an exemplary aspect of the invention, application event data may be maintained and utilized during low power management of a plurality of Bluetooth® devices. In this regard, each Bluetooth® device data record may comprise information related to a list of active applications, such as a profile ID and an application ID, a current event for each application, a number of active applications, a timer, modes attempted, and/or modes failed, for example.

Another embodiment of the invention may utilize various mechanisms to automatically manage low power mode changes so that applications do not need to manage the low power mode directly. Since a SCO connection cannot be opened while a Bluetooth® device is in park mode, if an application requests a SCO connection, software may be utilized to initiate a change to a low power mode for the Bluetooth® device to be active. When the mode change is complete, the SCO connection may be initiated.

Figure 10:
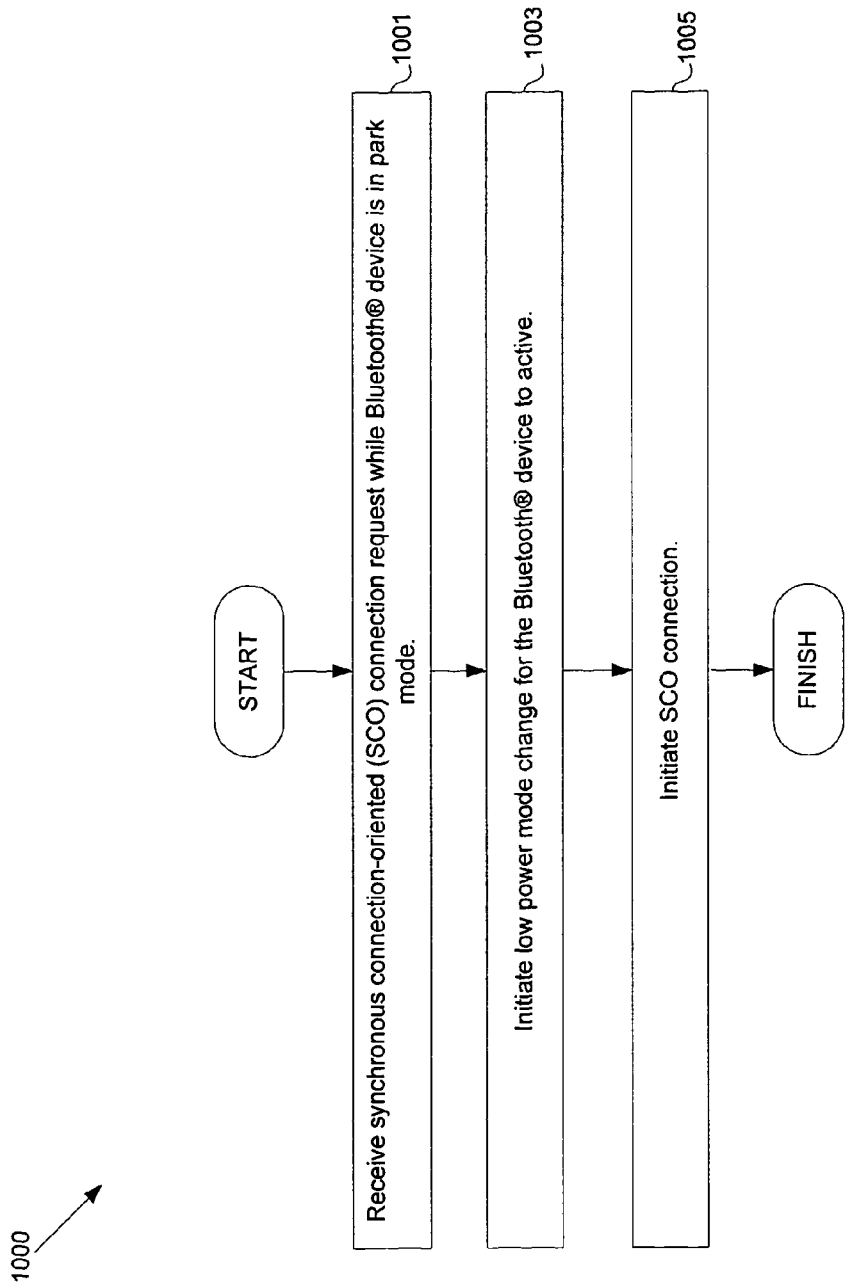
FIG. 10 is a flow diagram of an exemplary method for automatic management of a synchronous connection-oriented (SCO) connection by a Bluetooth® device while in park mode, in accordance with an embodiment of the invention.

FIG. 10 is a flow diagram 1000 of an exemplary method for automatic management of a synchronous connection-oriented (SCO) connection by a Bluetooth® device while in park mode, in accordance with an embodiment of the invention. Referring to FIG. 10, at 1001, SCO connection request may be received by a Bluetooth® device while the Bluetooth® device is in park mode. At 1003, a low power mode change to active may be initiated for the Bluetooth® device. At 1005, the SCO connection may be initiated.

Since data may not be sent while a Bluetooth® device is in park mode, if the application sends data to the protocol stack, before the data is sent to the Bluetooth® chip the software will initiate a mode change to active. In this regard, when the mode change is complete, the data may be communicated to the Bluetooth® chip.

Figure 11:
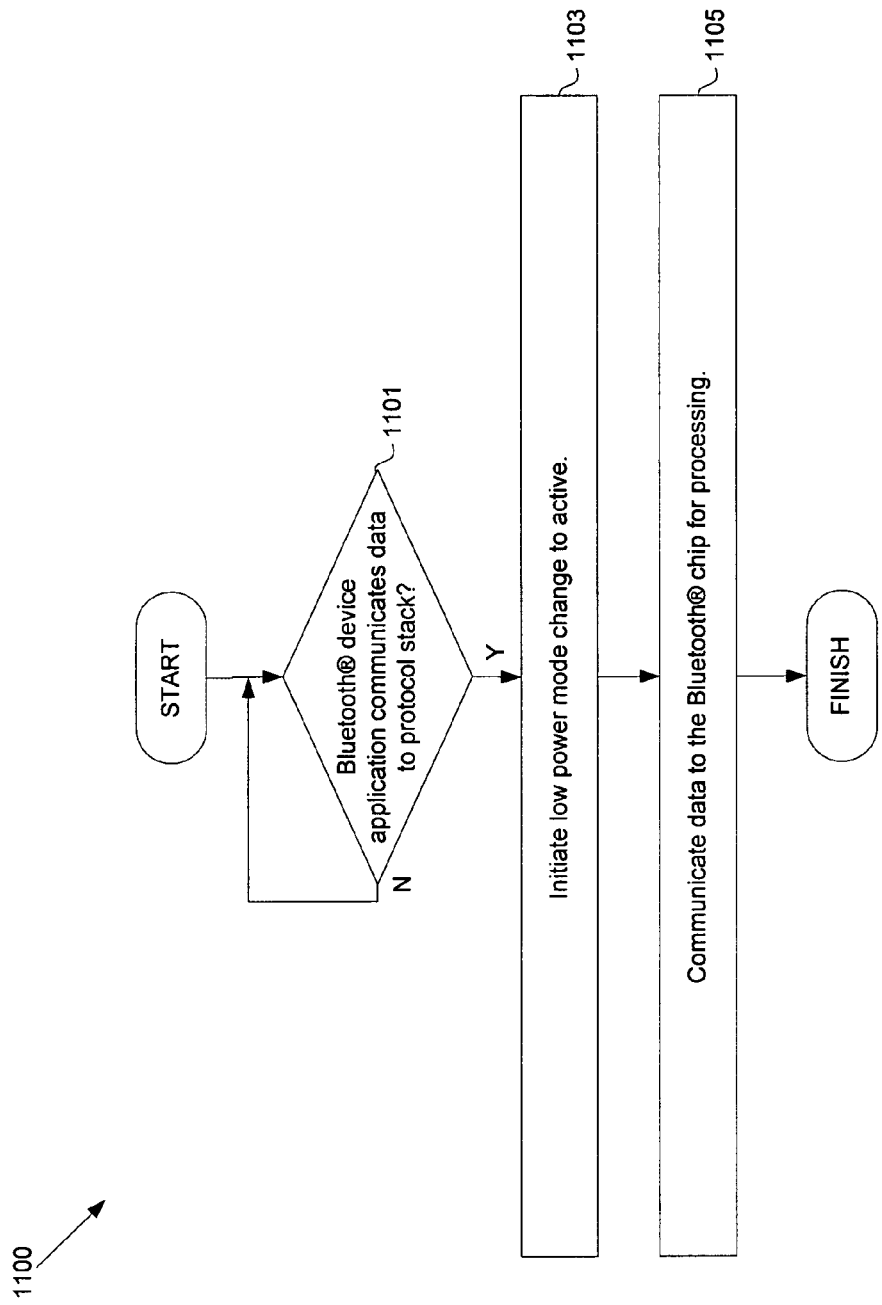
FIG. 11 is a flow diagram of an exemplary method for automatic communication of data by a Bluetooth® device while in park mode, in accordance with an embodiment of the invention.

FIG. 11 is a flow diagram 1100 of an exemplary method for automatic communication of data by a Bluetooth® device while in park mode, in accordance with an embodiment of the invention. Referring to FIG. 11, at 1101, it may be determined whether a Bluetooth® device communicates data to the protocol stack. If the Bluetooth® device communicates data to the protocol stack, at 1103, low power mode change to active may be initiated for the Bluetooth® device. At 1105, data may be communicated to the Bluetooth® chip for processing.

In accordance with an embodiment of the invention, the following pseudo code may be utilized to illustrate exemplary handling of the events.

```
On Protocol connection open,
On Protocol connection closed,
On Application open,
On Application closed,
On SCO open,
On SCO closed,
On Connection idle,
On Connection busy,
    Look up table for this application from profile id and app id
    Stop timer
    Store current event
    if application closed
        remove application from active list
        run procedure set_mode
On Power mode change to active,
    if status indicates mode change failed
        store attempted mode as failed
    run procedure set_mode
On Timer expired,
    run procedure set_mode
Procedure set_mode
    for each active application on the device
        look up allowed modes in table and accumulate allowed modes for
        all active applications
            look up first mode preference in table for current event
            if first mode preference has not already failed
                if this mode entry is the highest priority of all apps so far
                    set mode entry to current preference
                else if second mode preference has not already failed
                    if this mode entry is the highest priority of all apps so far
                        set mode entry to current preference
    end for
    if we have a current preference and it is allowed by all active
    applications
    if entry has a timeout
        start timer
    else if mode is sniff
        initiate sniff mode
    else if mode is park
        initiate park mode
    else if mode is hold
        initiate hold mode
    else if mode is active
        initiate active mode
```

Figure 12:
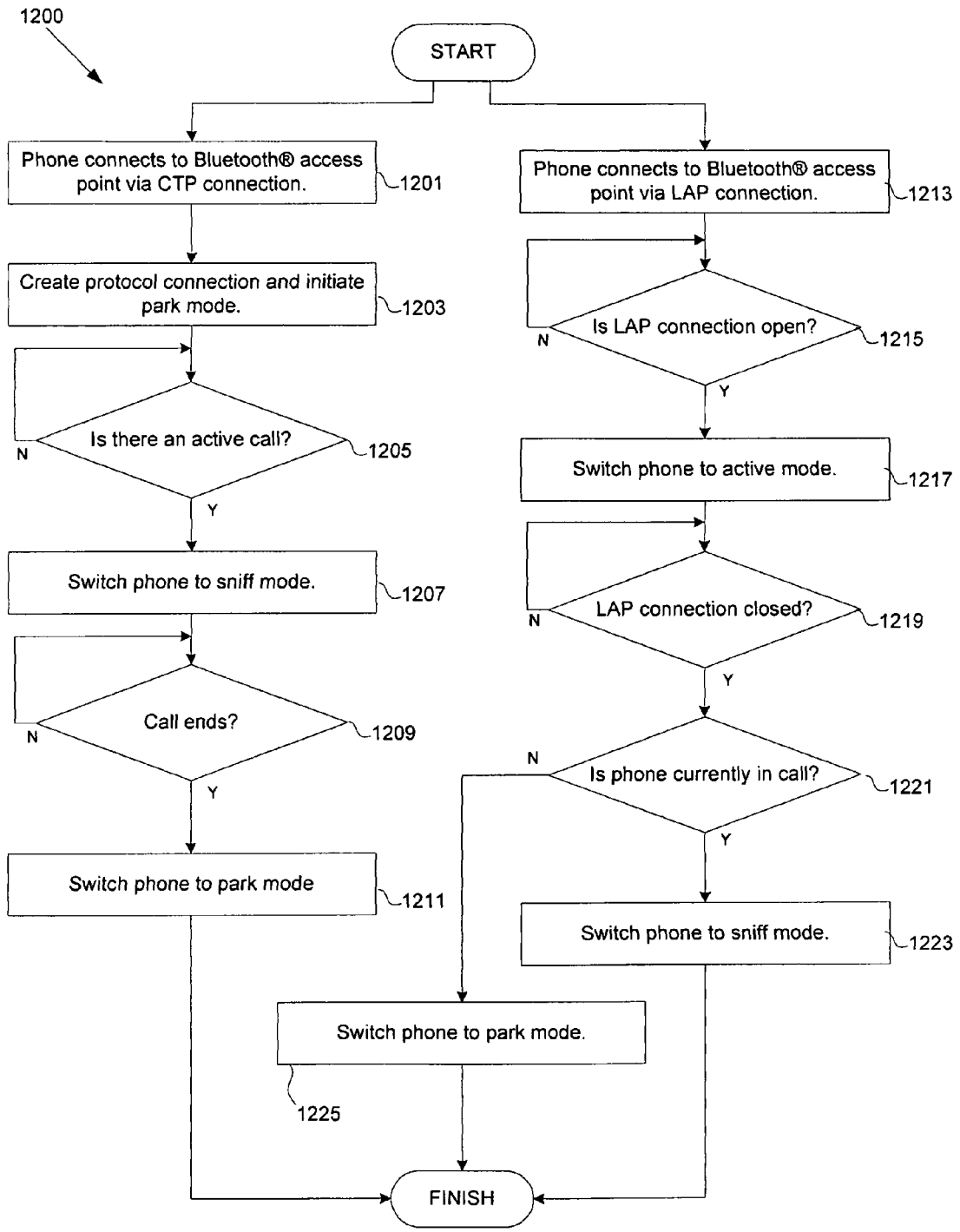
FIG. 12 is a flow diagram of an exemplary method for power management of a mobile phone with a Bluetooth® connection to an access point, in accordance with an embodiment of the invention.

In an exemplary embodiment of the invention, a Bluetooth®-enabled mobile phone may be connected to an access point utilizing a local area network (LAN) access profile (LAP) and/or a cordless telephony profile (CTP). FIG. 12 is a flow diagram 1200 of an exemplary method for power management of a mobile phone with a Bluetooth® connection to an access point, in accordance with an embodiment of the invention. Referring to FIG. 12, at 1201, the phone may connect to the Bluetooth® access point via a CTP connection. At 1203, protocol connection may be created and park mode may be initiated for the Bluetooth®-enabled phone. At 1205, it may be determined whether there is an active call to the phone. If there is an active call to the phone, at 1207, the low power mode profile for the phone may be switched to sniff mode. At 1209, it may be determined whether the current call has ended. If the call has ended, at 1211, the low power mode profile for the phone may be switched to park mode.

At 1213, the Bluetooth®-enabled phone may connect to the Bluetooth® access point via a LAP connection. At 1215, it may be determined whether the LAP connection is open. If the LAP connection is open, at 1217, the phone may be switched to an active mode. At 1219, it may be determined whether the LAP connection is closed. If the LAP connection is closed, at 1221, it may be determined whether the Bluetooth®-enabled phone is currently in a phone call. If the phone is currently active on a call, at 1223, the low power mode profile for the phone may be switched to sniff mode.

Aspects of the invention provide a centralized power management mechanism for Bluetooth® applications that is powerful enough to handle complex application scenarios while still being easy to configure and customize for the needs of the particular device. The table-based approach makes it easy to understand and set the low power mode operation of a particular application. The priority mechanism and multiple-choice mechanism in response to failures are adapted to provide versatility and improved device interoperability.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling a personal area network access device, the method comprising:
    receiving an application event associated with a particular application running on a Bluetooth® device that is running a plurality of simultaneous applications;
    determining whether a low power mode is allowed by said particular application running on said Bluetooth® device; and
    if said low power mode is allowed by said particular application running on said Bluetooth® device, configuring said Bluetooth® device running said particular application to operate utilizing said allowed low power mode.

2. The method according to claim 1, comprising switching said Bluetooth® device to said allowed low power mode based on said application event.

3. The method according to claim 1, comprising switching said Bluetooth® device from a current mode to an active mode prior to switching to said allowed low power mode based on said application event.

4. The method according to claim 1, wherein said application event is received by a low power manager.

5. The method according to claim 1, comprising communicating said application event from said particular application to a low power manager.

6. The method according to claim 1, wherein said low power mode comprises at least one of a sniff mode indicator, a hold mode indicator, and a park mode indicator.

7. The method according to claim 1, wherein said application event comprises at least one of a "protocol connection open" event, a "protocol connection closed" event, an "application open" event, an "application closed" event, a "SCO open" event, a "SCO closed" event, a "connection idle" event, a "connection busy" event, and a "power mode changed to active" event.

8. The method according to claim 1, comprising selecting settings for said allowed low power mode from a table.

9. The method according to claim 8, wherein said table comprises at least one representation of said low power mode corresponding to said particular application.

10. The method according to claim 8, wherein said table comprises a plurality of representations of simultaneous applications, at least one representation of allowed low power mode corresponding to each of said plurality of representations of simultaneous applications, and at least one representation of event associated with each of said plurality of representations of simultaneous applications.

11. The method according to claim 10, wherein said at least one representation of allowed low power mode is associated with a time interval which defines a period of time prior to which said allowed low power mode becomes active.

12. The method according to claim 10, wherein said allowed low power mode is active for a particular duration.

13. The method according to claim 12, comprising, if two or more of said plurality of simultaneous applications comprises said allowed low power mode, activating a low power mode which has smallest duration.

14. The method according to claim 1, comprising configuring said Bluetooth® device running said particular application to operate in an alternate low power mode, if switching to said allowed low power mode fails.

15. The method according to claim 14, comprising selecting said alternate low power mode from a table based on at least said received application event.

16. The method according to claim 15, comprising switching to an active mode from said allowed low power mode prior to switching to said alternate low power mode.

17. A machine-readable storage having stored thereon, a computer program having at least one code section for controlling a personal area network access device, the at least one code section being executable by a machine to perform steps comprising:
    receiving an application event associated with a particular application running on a Bluetooth® device that is running a plurality of simultaneous applications;
    determining whether a low power mode is allowed by said particular application running on said Bluetooth® device; and
    if said low power mode is allowed by said particular application running on said Bluetooth® device, configuring said Bluetooth® device running said particular application to operate utilizing said allowed low power mode.

18. The machine-readable storage according to claim 17, comprising code for switching said Bluetooth® device to said allowed low power mode based on said application event.

19. The machine-readable storage according to claim 17, comprising code for switching said Bluetooth® device from a current mode to an active mode prior to switching to said allowed low power mode based on said application event.

20. The machine-readable storage according to claim 17, wherein said application event is received by a low power manager.

21. The machine-readable storage according to claim 17, comprising code for communicating said application event from said particular application to a low power manager.

22. The machine-readable storage according to claim 17, wherein said low power mode comprises at least one of a sniff mode indicator, a hold mode indicator, and a park mode indicator.

23. The machine-readable storage according to claim 17, wherein said application event comprises at least one of a "protocol connection open" event, a "protocol connection closed" event, an "application open" event, an "application closed" event, a "SCO open" event, a "SCO closed" event, a "connection idle" event, a "connection busy" event, and a "power mode changed to active" event.

24. The machine-readable storage according to claim 17, comprising code for selecting settings for said allowed low power mode from a table.

25. The machine-readable storage according to claim 24, wherein said table comprises at least one representation of said low power mode corresponding to said particular application.

26. The machine-readable storage according to claim 24, wherein said table comprises a plurality of representations of simultaneous applications, at least one representation of allowed low power mode corresponding to each of said plurality of representations of simultaneous applications, and at least one representation of event associated with each of said plurality of representations of simultaneous applications.

27. The machine-readable storage according to claim 26, wherein said at least one representation of allowed low power mode is associated with a time interval which defines a period of time prior to which said allowed low power mode becomes active.

28. The machine-readable storage according to claim 26, wherein said allowed low power mode is active for a particular duration.

29. The machine-readable storage according to claim 28, comprising code for activating a low power mode which has smallest duration, if two or more of said plurality of simultaneous applications comprises said allowed low power mode.

30. The machine-readable storage according to claim 17, comprising code for configuring said Bluetooth® device running said particular application to operate in an alternate low power mode, if switching to said allowed low power mode fails.

31. The machine-readable storage according to claim 30, comprising code for selecting said alternate low power mode from a table based on at least said received application event.

32. The machine-readable storage according to claim 31, comprising code for switching to an active mode from said allowed low power mode prior to switching to said alternate low power mode.

33. A system for controlling a personal area network access device, the system comprising:

at least one processor configured to receive an application event associated with a particular application running on a Bluetooth® device that is running a plurality of simultaneous applications;

said at least one processor configured to determine whether a low power mode is allowed by said particular application running on said Bluetooth® device; and said at least one processor configured to configure said Bluetooth® device running said particular application to operate utilizing said allowed low power mode, if said low power mode is allowed by said particular application running on said Bluetooth® device.

34. The system according to claim 33, wherein said at least one processor is configured to switch said Bluetooth® device to said allowed low power mode based on said application event.

35. The system according to claim 33, wherein said at least one processor is configured to switch said Bluetooth® device to an active mode from a current mode prior to switching to said allowed low power mode based on said application event.

36. The system according to claim 33, comprising a low power manager that is configured to receive said application event.

37. The system according to claim 33, wherein said at least one processor is configured to communicate said application event from said particular application to a low power manager.

38. The system according to claim 33, wherein said low power mode comprises at least one of a sniff mode indicator, a hold mode indicator, and a park mode indicator.

39. The system according to claim 33, wherein said application event comprises at least one of a "protocol connection open" event, a "protocol connection closed" event, an "application open" event, an "application closed" event, a "SCO open" event, a "SCO closed" event, a "connection idle" event, a "connection busy" event, and a "power mode changed to active" event.

40. The system according to claim 33, wherein said at least one processor is configured to select settings for said allowed low power mode from a table.

41. The system according to claim 40, wherein said table comprises at least one representation of said low power mode corresponding to said particular application.

42. The system according to claim 40, wherein said table comprises a plurality of representations of simultaneous applications, at least one representation of allowed low power mode corresponding to each of said plurality of representations of simultaneous applications, and at least one representation of event associated with each of said plurality of representations of simultaneous applications.

43. The system according to claim 42, wherein said at least one representation of allowed low power mode is associated with a time interval which defines a period of time prior to which said allowed low power mode becomes active.

44. The system according to claim 42, wherein said allowed low power mode is configured to be active for a particular duration.

45. The system according to claim 44, wherein said at least one processor is configured to activate a low power mode which has smallest duration, if two or more of said plurality of simultaneous applications comprises said allowed low power mode.

46. The system according to claim 33, wherein said at least one processor is configured to configure said Bluetooth® device running said particular application to operate in an alternate low power mode, if switching to said allowed low power mode fails.

47. The system according to claim 46, wherein said at least one processor is configured to select said alternate low power mode from a table based on at least said received application event.

48. The system according to claim 47, wherein said at least one processor is configured to switch to an active mode from said allowed low power mode prior to switching to said alternate low power mode.

* * * * *